United States Patent
Wilson

(10) Patent No.: US 10,112,703 B2
(45) Date of Patent: Oct. 30, 2018

(54) DRIVE SYSTEM FOR LANDING GEAR AND DRIVE SYSTEM CONTROL METHOD

(71) Applicant: AIRBUS OPERATIONS LIMITED, Bristol (GB)

(72) Inventor: Fraser Wilson, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 241 days.

(21) Appl. No.: 15/123,293

(22) PCT Filed: Mar. 5, 2015

(86) PCT No.: PCT/GB2015/050630
§ 371 (c)(1),
(2) Date: Sep. 2, 2016

(87) PCT Pub. No.: WO2015/132590
PCT Pub. Date: Sep. 11, 2015

(65) Prior Publication Data
US 2017/0066529 A1  Mar. 9, 2017

(30) Foreign Application Priority Data

Mar. 5, 2014  (GB) .................................. 1403840.0
Mar. 17, 2014 (GB) .................................. 1404699.9

(51) Int. Cl.
*B64C 25/50* (2006.01)
*B64C 25/40* (2006.01)
(Continued)

(52) U.S. Cl.
CPC ............ *B64C 25/405* (2013.01); *B64C 25/34* (2013.01); *F16H 1/06* (2013.01); *F16H 55/10* (2013.01);
(Continued)

(58) Field of Classification Search
CPC ................... B64C 25/34; B64C 25/405; F16H 2057/0081; F16H 2057/018
See application file for complete search history.

(56) References Cited

U.S. PATENT DOCUMENTS 2,895,342 A    7/1959  Hayhurst
7,658,124 B2   2/2010  Brosowske et al.
(Continued)

FOREIGN PATENT DOCUMENTS

EP    2527249 A1   11/2012
EP    2551192 A2   1/2013
(Continued)

OTHER PUBLICATIONS

Hiroshi Honda and Hiroshi Makino, "Research on the Trochoidal Gears (1st Report): Classification and Basic Formulas of the Trochoidal Gears". Translation of Journal of the Japan Society for Precision Engineering, 1994, vol. 50, No. 7, p. 949-953.
(Continued)

*Primary Examiner* — Richard G Davis
(74) *Attorney, Agent, or Firm* — Nixon & Vanderhye, PC

(57) ABSTRACT

A method for controlling a separation between rotational axes of a pair of meshing gears is disclosed. A parameter indicative of a transmission error through the gears is measured and the separation is controlled, aiming to minimise variations in the measured signal. This acts to reduce variations in transmission error and the related vibrations created in the drive system and in the surrounding components. A related drive system and aircraft landing gear are described.

23 Claims, 11 Drawing Sheets

(51) Int. Cl.
*F16H 57/12* (2006.01)
*F16H 57/00* (2012.01)
*B64C 25/34* (2006.01)
*F16H 1/06* (2006.01)
*F16H 55/10* (2006.01)
*F16H 57/01* (2012.01)

(52) U.S. Cl.
CPC ......... *F16H 57/0006* (2013.01); *F16H 57/01* (2013.01); *F16H 57/12* (2013.01); *F16H 2057/0012* (2013.01); *F16H 2057/012* (2013.01); *F16H 2057/123* (2013.01); *Y02T 50/823* (2013.01)

(56) References Cited

U.S. PATENT DOCUMENTS

| | | |
|---|---|---|
| 2006/0065779 A1 | 3/2006 | McCoskey et al. |
| 2012/0153075 A1 | 6/2012 | Wilson et al. |
| 2012/0312112 A1 | 12/2012 | Tizac |
| 2013/0026284 A1 | 1/2013 | Christensen et al. |
| 2014/0225421 A1* | 8/2014 | Oswald ................. B64C 25/405 301/6.2 |
| 2015/0210384 A1* | 7/2015 | Geck .................... B64C 25/405 244/50 |
| 2015/0210385 A1 | 7/2015 | Didey |

FOREIGN PATENT DOCUMENTS

| | | |
|---|---|---|
| JP | H03213750 A | 9/1991 |
| WO | 9300530 A1 | 1/1993 |
| WO | 0146605 A1 | 6/2001 |
| WO | 2008013599 A2 | 1/2008 |
| WO | 2011023505 A2 | 3/2011 |
| WO | 2012171589 A1 | 12/2012 |
| WO | 2013013874 A1 | 1/2013 |
| WO | 2014023941 A1 | 2/2014 |

OTHER PUBLICATIONS

Hiroshi Honda, "Research on the Trochoidal Gears (2nd Report): Pressure Angle of Trochoidal Gears and Modification of Tooth Profile". Translation of Journal of the Japan Society for Precision Engineering, 1995, vol. 61, No. 2, p. 208-212.

International Search Report and Written Opinion of the ISA dated Jun. 5, 2015 International Application No. PCT/GB2015/050630.

* cited by examiner

DRIVE SYSTEM FOR LANDING GEAR AND DRIVE SYSTEM CONTROL METHOD

RELATED APPLICATIONS

The present application is a National Phase of International Application Number PCT/GB2015/050630, filed Mar. 5, 2015, which claims priority from Great Britain Application Number 1403840.0, filed Mar. 5, 2014, and Great Britain Application Number 1404699.9, filed Mar. 17, 2014.

FIELD OF THE INVENTION

The present invention relates to a drive system for rotating one or more wheels of an aircraft landing gear for the purposes of ground taxiing (forwards or reverse) and/or wheel spin-up prior to landing and/or for applying braking torque to the rotating wheel(s). The invention also relates to a method of operating the landing gear.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations. There is also a desire to use such a drive system to pre-spin the wheels prior to landing, so that the wheels are already spinning at, or near, their initial landing speed on touch down. Such pre-landing spin-up is perceived to reduce tyre wear on landing, and reduce loads transmitted to the landing gear during landing.

Several autonomous ground taxi systems for both driving the wheels while the aircraft is on the ground and spinning them up prior to landing have been proposed in recent years.

An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

Such prior art systems are typically limited to nose landing gears because they take up too much space to be able to be integrated into a main landing gear in which much of the space around the wheels is taken up by braking systems. However, nose landing gears only support a small fraction of the vertical loads supported by the landing gear as a whole during ground taxi operations (approximately 5% of the aircraft weight). There may therefore be insufficient traction between a driven nose landing gear wheel and the ground to enable reliable aircraft ground taxiing. This is a particular concern when the aircraft centre of gravity is towards its aft limit and when the ground surface is slippery.

A prior art arrangement which is not restricted to nose landing gears is described in WO2011/023505. The disclosed system uses an actuator to move a pinion gear in and out of driving engagement with a ring gear mounted to the wheel hub.

SUMMARY OF THE INVENTION

A first aspect of the invention provides a drive system for an aircraft landing gear comprising: first and second gears for engagement to transfer a drive input to the system between the first and second gears; an actuator for adjusting a distance between rotational axes of the first and second gears; a sensor for detecting at least one parameter indicative of a transmission error through the first and second gears; and a controller for controlling the actuator to adjust a distance between respective rotational axes of the gears, in response to the detected parameter, when the first and second gears are engaged to minimise the transmission error.

A further aspect of the invention provides a method of controlling engagement of first and second gears in a drive system, comprising the steps of: detecting at least one parameter indicative of a transmission error through first and second gears of the drive system; and adjusting a distance between respective rotational axes of the gears in response to the detected parameter to minimise the transmission error. The adjustment step is preferably performed automatically and effected by an actuator.

By detecting at least one parameter indicative of a transmission error through the first and second gears, and adjusting a distance between the rotational axes of the two gears to minimise the transmission error, the drive system can act to minimise vibrations and/or wear due to the transmission error.

This can reduce overall vibrations transmitted to surrounding components. It is especially important in aircraft landing gear to reduce the amplitude of vibrations of particular frequencies, since these may otherwise cause damage to the landing gear structure, or the landing gear structure may need to be modified to accommodate these vibrations which usually results in an undesirable increase in weight leading to increased fuel burn and increased manufacturing and operational costs.

Transmission error is a measurement of the consistency of an output rotation from a transmission for a constant input. For a constant rotational input, transmission error results in a non-constant rotational output, where an output of a transmission shows variations in speed or torque. These variations can be defined as transmission error and can be measured in units of minutes of arc or arcmin, which equates to one sixtieth of a degree. The transmission error can be expressed as a variation in output rotation which can be expected for a known input rotation.

If rigid gears in meshing engagement have fixed centres (respective axes of rotation then the centre distance is typically selected to minimise the transmission error. However, in the drive system of this invention at least one of the gears has a non-fixed centre. This may be due to a variety of factors, e.g. the need to radially separate the gears when gear engagement is undesirable, and/or the need to accommodate ovalisation of at least one of the gears under load. Under these circumstances it has been found that the transmission error would otherwise reach unacceptable levels without the actuator and controller for dynamically adjusting the centre distances of the gears to minimise the transmission error.

It is theoretically possible to design gears that produce zero transmission error. In practice some transmission error is normally observable and this can rise dramatically as the gears wear. Gear wear induced transmission error can rise exponentially leading to rapid failure. With non-fixed centre distances and/or ovalisation of gears it becomes almost impossible to produce zero transmission error. However, the inventors have found that it is possible to minimise the transmission error so reducing the detrimental effects of vibration and wear on the drive system.

Various parameters indicative of the transmission error can be monitored, including one or more of:
- a distance measured between respective rotational axes of the first and second gears;
- a torque measured at one or more points in a drive path from a motor to a wheel of an aircraft landing gear where the drive path includes the first and second gear, e.g. a torque differential between two points in the drive path, the two points being one on either side of the engagement between the first and second gears;
- a current draw of a motor providing drive input to the drive system;
- a current demand at a motor controller for controlling a motor providing drive input to the drive system;
- a rotational velocity at one or more points in a drive path from a motor to a wheel of an aircraft landing gear where the drive path includes the first and second gears, e.g. a rotational velocity differential between two points in the drive path, the two points being one on either side of the engagement between the first and second gears.

All of the above can be indicative of the likely generation of vibrations when variations in the signal of the measured parameter are observed. Adjusting the actuator to minimise variations in these signals is a way of reducing the overall vibration generated by the transmission error.

Controlling the actuator to reduce an amplitude of oscillations in the measured parameter is also an improved way of reducing the likely generation of vibrations in the system.

Certain changes in the measured parameter, or variations in the measured parameter, such as an increase in magnitude of variations in the measured parameter, can indicate a wear condition of the first and/or second gears. Therefore, it is possible to monitor the measured parameter to identify a wear condition and predict when the gears may need replacement or maintenance.

The first gear may be a roller gear comprising a series of rollers arranged to form a ring, each roller being rotatable about a roller axis located at a fixed distance from the rotational axis of the first gear; and the second gear may be a sprocket comprising an array of sprocket teeth for engagement with the rollers of the first gear.

Alternatively, the first and second gears may be spur gears, or other toothed gears.

A key advantage of achieving the drive via a sprocket and roller gear is that such a mechanism is inherently robust and tolerant of environmental contamination. Thus, it may not be necessary to enclose the drive system within a casing to prevent ingress of debris and other contaminants.

Profiling of the sprocket teeth can further assist with reducing vibration due to transmission error. For example, trochoid or cycloid tooth profiles may be used, and may be particularly effective in combination with the active control of gear separation of the present invention. Providing a trochoid or cycloid profile portion on a load-bearing, or working, face of the sprocket tooth profile can result in a more constant velocity being transmitted through the gears, which helps to reduce the overall transmission error generated by the drive system. In particular the sprocket teeth may include a "conventional" involute tooth profile portion and a trochoid or cycloid tooth profile portion.

A further aspect of the invention provides a drive system for an aircraft landing gear comprising: first and second gears for engagement to transfer a drive input to the system between the first and second gears; the first gear is a roller gear comprising a series of rollers arranged to form a ring, each roller being rotatable about a roller axis located at a fixed distance from the rotational axis of the first gear; and the second gear is a sprocket comprising an array of sprocket teeth for engagement with the rollers of the first gear, where the sprocket teeth include an involute tooth profile portion and a trochoid or cycloid tooth profile portion. This aspect of the invention may be combined with any other aspect of the invention described herein.

In some embodiments the series of rollers may be provided by a roller gear. Thus, each of the series of rollers may be rotatable about a pin, the pins optionally being supported by an annular support member, or between two annular support members. In other embodiments the series of rollers may be provided by a roller chain (also known as an attachment chain, or attachment roller chain) extending around an outer circumference of a support member and being fixed thereto. This arrangement may be less expensive to implement than the roller gear arrangement discussed above.

Another advantage of the sprocket-roller arrangement is that it is more tolerant of wheel deformation and misalignment between pinion and driven gear than meshing toothed gear arrangements. Landing gear wheels are subject to high loads and consequential deformation during ground taxiing, and a driven gear fixed to the wheel will inevitably deform in response to such wheel deformation. Meshing gears are generally intolerant of such deformation and so the wheel rim gear may need to be isolated from the wheel via bearings, a flexible interface, or similar, to avoid excessive ovalisation of the wheel rim gear. Deformation of the wheel mounted gear (whether with a flexible interface or directly attached to the wheel) poses a challenge for meshing engagement with the drive pinion without introducing high transmission error and vibration.

Using the active control of the centre distances of first and second gears of the present invention, vibrations generated in the drive system can be minimised, Providing the roller gear as the drive pinion and the sprocket as the driven gear (rather than vice versa) may provide a mass optimised solution. Moreover, the roller gear is likely to require more frequent repair or replacement than the sprocket and by arranging the drive pinion as the roller gear enables easier removal of the roller gear without the need to remove the landing gear wheel.

The drive system may have a first configuration in which the first gear is capable of meshing with the second gear to connect a drive input from the motor to the wheel, and a second configuration in which the first gear is not capable of meshing with the second gear.

The use of the same actuator (or actuators) to move a landing gear drive system between first and second configurations to engage and disengage the motor from the wheel, and to adjust the gear separation to minimise vibrations results in improved efficiency of use of components and a lightweight overall arrangement.

However, in an alternative arrangement movement of the landing gear drive system in the first configuration may be limited by a stop, and the actuator for adjusting the distance between rotational axes of the first and second gears may be coupled to the stop for moving the stop. Movement of the stop thereby adjusts the distance between the rotational axes of the first and second gears.

Preferably, the drive system is detachably mounted on the landing gear main leg. The drive system can therefore be removed for maintenance and/or when the aircraft is to be used for long range operations where it may not be economic to use the drive transmission due to its weight penalty in cruise.

The drive transmission may be mounted externally on the landing gear on either the sprung part (e.g. the strut) or on the un-sprung part (e.g. the slider or axle or bogie). The drive system may be pivotally mounted on the landing gear. The output shaft carrying the drive pinion may rotate about a substantially horizontal pivot axis displaced from the axis of rotation of the drive pinion. The first and second gears may move into and out of engagement by rotation about the pivot axis. The motor may move with the drive pinion about the pivot axis, or alternatively the motor may be static with respect to the pivot axis, or further alternatively the motor may rotate about the pivot axis as the drive pinion moves through an arc centred on the pivot axis.

The drive pinion and/or the driven gear may include a constant-velocity joint or similar device between the gear and the shaft on which it is rotatably mounted. This can help to ensure that the driving engagement can be maintained as the landing gear deflects.

The landing gear may have only one driveable wheel. Alternatively, two or more of the landing gear wheels may he driven by one or more motors. A differential may be used between the motor(s) and the drive pinions. The motor may be electric or hydraulic, for example.

The gear attached to the wheel preferably has a larger diameter than the drive pinion to develop a significant torque magnifying gear ratio. By making use of the large hub diameter in this way, a mass optimised solution can he achieved.

When incorporated on an aircraft, the landing gear may be used with a power and control system for supplying power to, and controlling operation of, the drive transmission.

BRIEF DESCRIPTION OF THE DRAWINGS

Embodiments of the invention will now be described with reference to the accompanying drawings, in which.

DETAILED DESCRIPTION OF EMBODIMENT(S)

The illustrated embodiments are shown applied to an aircraft landing gear which has two wheels, but the principles of the embodiments may be applied to landing gear with any number of wheels including only a single wheel. The embodiments are applied to a main landing gear (i.e. a landing gear attached to wing structure or fuselage structure in the region of the wings), since the weight supported by the main landing gear is considered to provide the best traction between the wheels and the ground to enable reliable aircraft ground taxiing. However, the drive system of the present invention may alternatively be applied to a nose landing gear (i.e. a steerable landing gear towards the nose of the aircraft). The main landing gear shown is applicable to a single aisle passenger airliner (approximately 150-200 pax), although it will be appreciated that this invention has wide applicability to a variety of aircraft types and weights, including civil aircraft, military aircraft, helicopters, passenger aircraft (<50 pax, 100-150 pax, 150-250 pax, 250-450 pax, >450 pax), freighters, tilt-rotor aircraft, etc.

The drive system of the present invention can also be applied to other drive chains, such as heavy machinery, vehicles, mining equipment, and any other machinery using rotational drive systems to realise the benefits of the invention, as will become apparent in the detailed description of the embodiments described herein.

Figure 1:
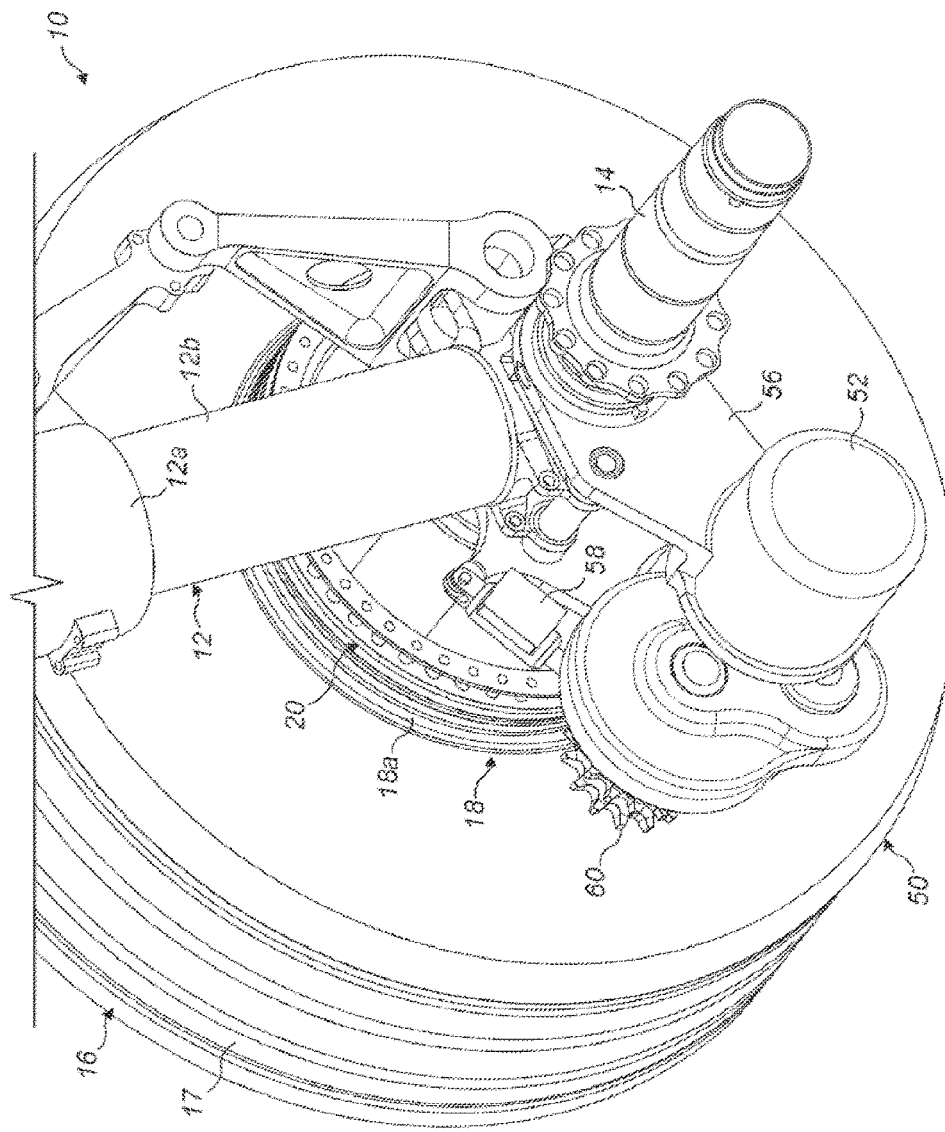
FIG. 1 shows an isometric view of a drive system according to a first embodiment.
Figure 2:
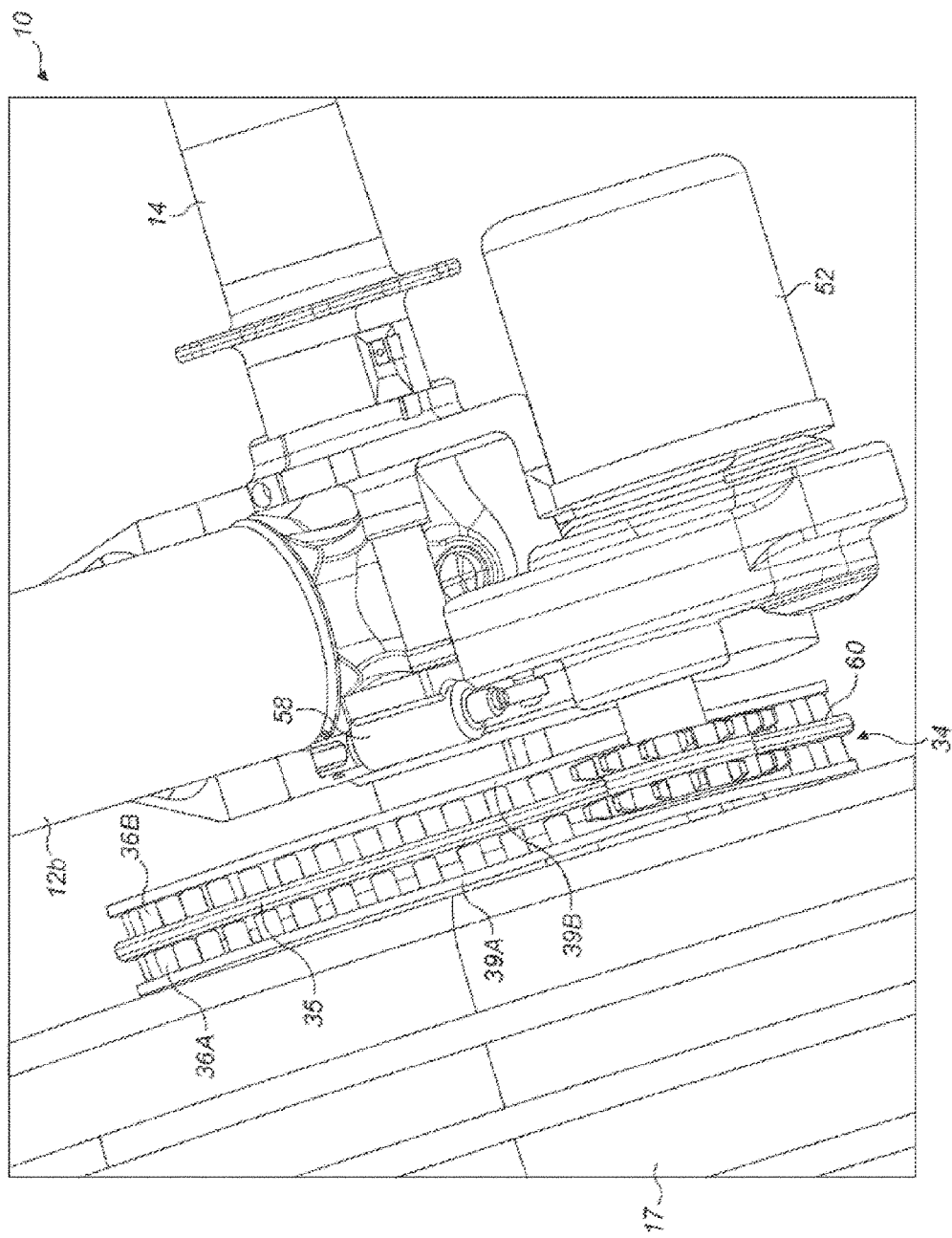
FIG. 2 shows a further isometric view of the drive system of FIG. 1.

The landing gear 10 includes a telescopic shock absorbing main leg 12, including an upper telescopic part 12a (main fitting) and a lower telescopic part 12b (the slider). The upper telescopic part 12a is attached to the aircraft fuselage or wing (not shown) by its upper end (not shown). The lower telescopic part 12b supports an axle 14 carrying a pair of wheels 16, one on either side of the main leg (only one wheel 16 is shown in FIGS. 1 and 2, for clarity). The wheels 16 are arranged to rotate about the axle 14 to enable ground movement of the aircraft, such as taxiing or landing.

Each wheel 16 comprises a tyre 17 supported by a hub 18 having a rim 18a at its outer edge which holds the tyre 17. A driven gear 20 is attached to the hub 18 (preferably at the rim 18a) so as to be rotatable with the wheel 16. The driven gear 20 may be attached to the wheel 16 by a plurality of discrete couplings, which may provide a rigid or flexible attachment. Alternatively, the attachment may be via a flange forming a continuous extension rim projecting axially from either the wheel 16 or the driven gear 20.

The drive system 50 includes a motor 52 which transmits torque to a drive shaft 54 via a gearbox 70. The drive system 50 is supported by a bracket 56 which is rigidly connected to the axle 14 of the landing gear. The bracket 56 includes two lugs comprising half moon clamps to permit ready attachment and detachment of the bracket 56 to the axle 14. The motor 52 is fixedly connected, e.g. by bolting, to the bracket 56. The gearbox 70 is pivotally connected to the bracket 56 at pivot lugs 82 on each arm of the bracket 56 disposed either side of the gearbox 70.

A drive pinion 60 is mounted on the drive shaft 54 so as to be rotatable by the drive shaft about a drive axis. The drive pinion 60, drive shaft 54 and gearbox 70 are pivotable by a linear actuator (positioner) 58, such as a direct drive roller screw electro mechanical linear actuator, extends between the bracket 56 (at an end nearest the axle 15) and the gearbox 70, or more particularly the housing 84 of the gearbox. Thus, linear movement of the actuator 58 is translated into rotational movement of the gearbox 70 and the sprockets 60 about the pivot 82. The drive system 50 can therefore be between a neutral configuration (not shown) in which the drive pinion 60 does not mesh with the driven gear 20, and a driven configuration (shown in FIGS. 1, 2 and 3) in which the drive pinion 60 is in meshed engagement with the driven gear 20. In the neutral configuration the wheel 16 is able to rotate freely, e.g. during take-off and landing, while in the driven configuration the wheel 16 can be driven by the drive system 50, e.g. during ground taxiing.

In the embodiment of FIGS. 1 and 2 the driven gear 20 comprises a roller gear 24 and the drive pinion 60 comprises a sprocket.

The roller gear 24 is formed by a rigid annular ring 35 and a series of pins 28 projecting from both sides of the annular ring 35. A first series of rollers 36a rotatably supported by the pins 38 is provided on one side of the annular ring 35, and a second series of rollers 36b rotatably supported by the pins as provided on the other side of the annular ring. Each series of rollers 36a, 36b extends around the annular ring to form a continuous track. First and second lateral annular rings 39a, 39b sandwich the first and second series of rollers 36a, 36b. The pins 38 supporting the first series of rollers 36a extend between the annular ring 35 and the first lateral annular ring 39a, and the pins 38 supporting the second series of rollers 36b extend between the annular ring 35 and the second lateral annular ring 39b. The annular ring 35 therefore forms a central spine for supporting the pins which are cantilevered off the central spine. The annular ring 35 comprises a plurality of axially extending connection extension tabs (not shown) providing mounting means for mounting the roller gear 34 to the hub 18. Alternatively, the tabs may be substituted for the annular ring 35.

The drive pinion 60 comprises a sprocket having two coaxial rings of radially extending sprocket teeth which can interlock with the rollers 36 of roller gear 34. That is, each ring of sprocket teeth is arranged to mesh with one of the rings of rollers of the driven gear 20.

Figure 3:
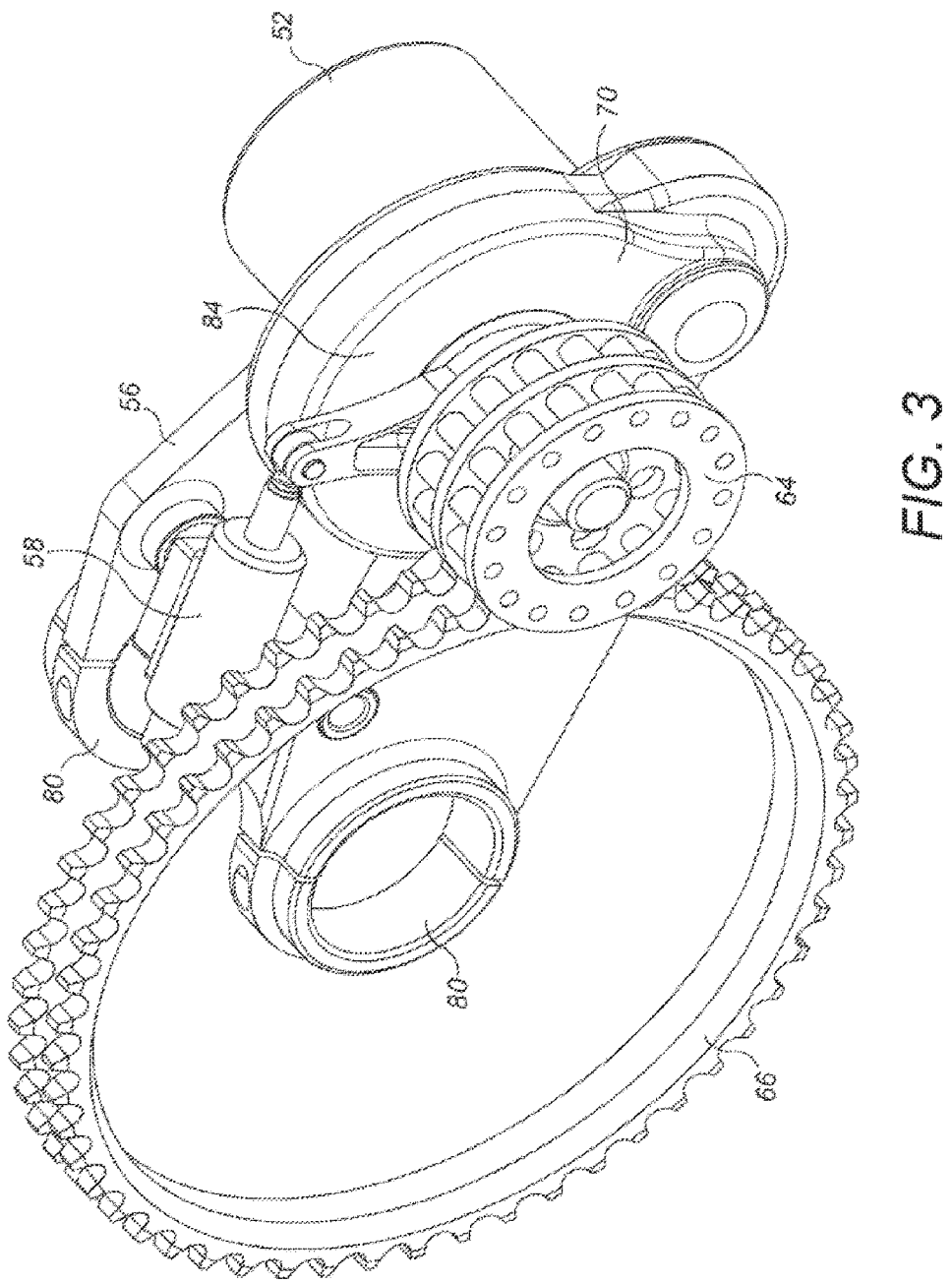
FIG. 3 shows an isometric view of selected components of a drive system according to a second embodiment.

FIG. 3 shows an alternative, and preferred, embodiment in which the driven gear 20 comprises a sprocket instead of a roller gear, and the drive pinion comprises a roller gear instead of a sprocket. Thus, the drive pinion comprises a roller gear 64 having two coaxial rings of rollers and the driven gear 20 is replaced by sprocket 66 having two coaxial rings of sprocket teeth. In all other respects the drive system is identical to that described above with reference to FIGS. 1 and 2, and the features of the drive system described below apply equally to both embodiments. The roller gear 64 may be constructed similarly to the roller gear 34, although of course it has a much smaller diameter and therefore fewer rollers.

An advantage of the sprocket-roller gear arrangement is that it is more tolerant of wheel and axle deformation than meshing toothed gear arrangements. Landing gear wheels and axles are subject to high loads and consequential deformation during ground taxiing, and a driven gear fixed to the wheel will inevitably deform in response to such deformation. Meshing toothed gears are intolerant of such deformation and a typical toothed rim gear may need to be isolated from the wheel via bearings, a flexible interface, or similar. In contrast, the sprocket and roller arrangement of the present invention may be able to tolerate the deformation without such modification.

Such an arrangement also has the advantage of being lightweight and having high structural strength. The main failure mode of the rollers is via shear failure of the pins; by mounting each roller directly on its respective pin, with no intermediate sleeve, bush or other part, the diameter of the pin can be maximised to maximise shear strength.

However, a problem with a sprocket-roller gear arrangement identified by the inventor is that a variation in roller gear velocity occurs with each tooth to roller engagement and disengagement. That is, the torque transfer from the drive pinion to the driven gear is not smooth, but is instead subject to cyclical variations. This torque/velocity variation may lead to undesirable vibration within the landing gear and aircraft wheel during operation of the drive system.

This vibration is not observed exclusively in sprocket-roller gear engagements but is observed more generally as a transmission error in all gear engagements, e.g. with spur gears or other toothed gears, with a non-fixed centre distance. It has been found that the problem of transmission error is particularly acute with sprocket-roller gear engagements but the principles of the invention apply similarly to spur gears and other toothed gears.

The delivered torque varies both as each roller moves along a tooth profile, and as each roller engages with or disengages from a tooth. This is illustrated in FIGS. 4 to 7, which show an example schematic torque profile and illustrate the roller-sprocket tooth dynamics at various significant parts of that profile. In FIGS. 4 to 7 the roller gear is the drive pinion and the sprocket is the driven gear (as in the embodiment of FIG. 3). The torque profile has a generally periodic or cyclical shape, with each phase (corresponding to the time between each sprocket-roller engagement) containing two maxima (labelled max1 and max2) and two minima (labelled min1 and min2). The skilled person will understand that the illustrated torque profile is merely an example, and that the torque profile, while always having a generally 'saw tooth' shape, may vary with the tooth pitch, the particular shape of the sprocket teeth, the size of the rollers, and many other variables.

As the skilled person will appreciate, the torque transfer between a roller and a sprocket tooth is dependent on the radial distance from the rotational centre of the driven gear at which the force is applied, and the direction in which that force is applied. That is, torque transfer is maximised when the contact point between the roller and sprocket tooth occurs at the largest radial distance from the driven gear (sprocket) centre, and when the force vector at that contact point is orthogonal to the local radius of the driven gear (i.e. tangential to the driven gear). The torque thus varies as these attributes vary.

Figure 4:
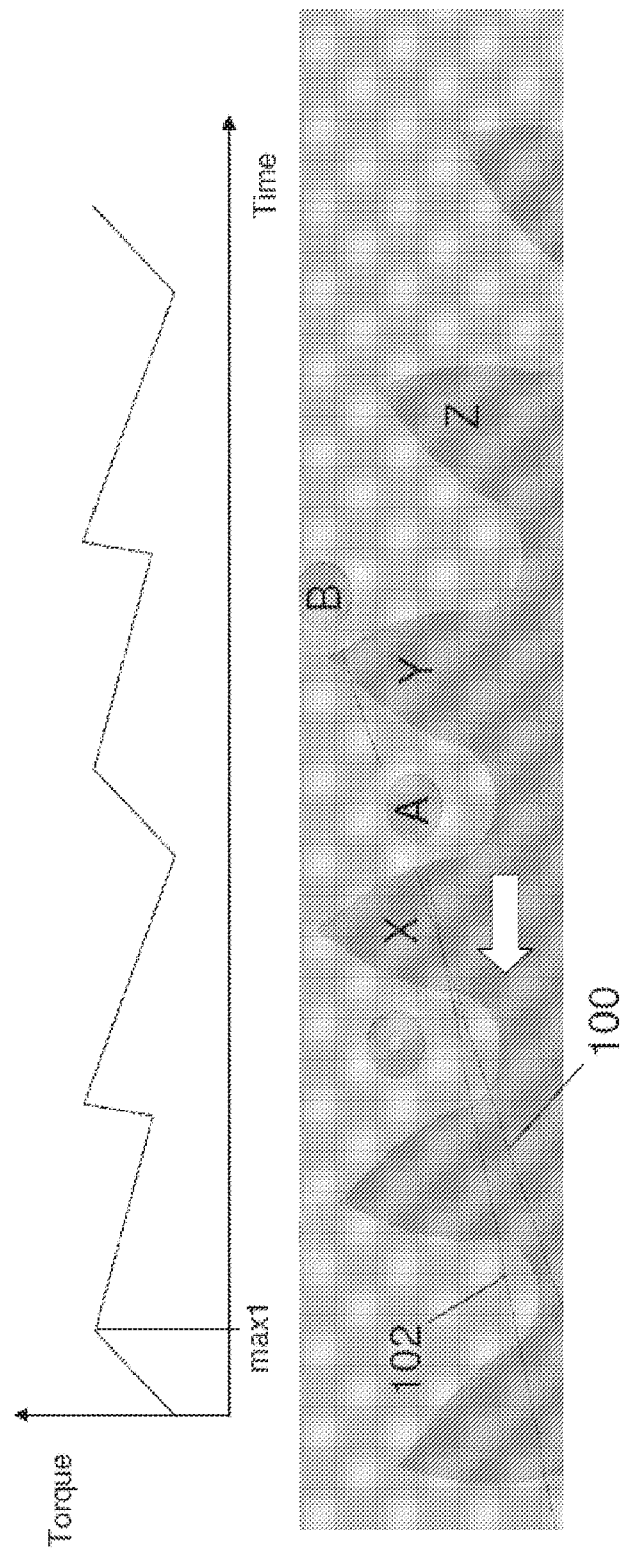
FIGS. 4 to 7 show schematic representations of the torque variations experienced at various stages of a roller gear roller/sprocket tooth engagement cycle.

FIG. 4 shows the relative positions of the rollers and sprocket teeth at the time corresponding to the maximum labelled maxi. Here, two rollers A, B are engaged with two sprocket teeth Y, Z, respectively. Force vector 100 indicates the direction of force transfer between roller B and tooth Y, while force vector 102 indicates the direction of force transfer between roller A and tooth X. It can be seen from force vector 100 that roller B is close to its maximum radial distance from the driven gear centre, but has a force vector angle which is substantially lower than 90 degrees to the local radius of the driven gear. Force vector 102 shows that roller A is approaching a minimum. radial distance, but has a force vector angle which is near to 90 degrees. The sum of these force vectors 100, 102 provides a torque maximum, max1.

Figure 5:
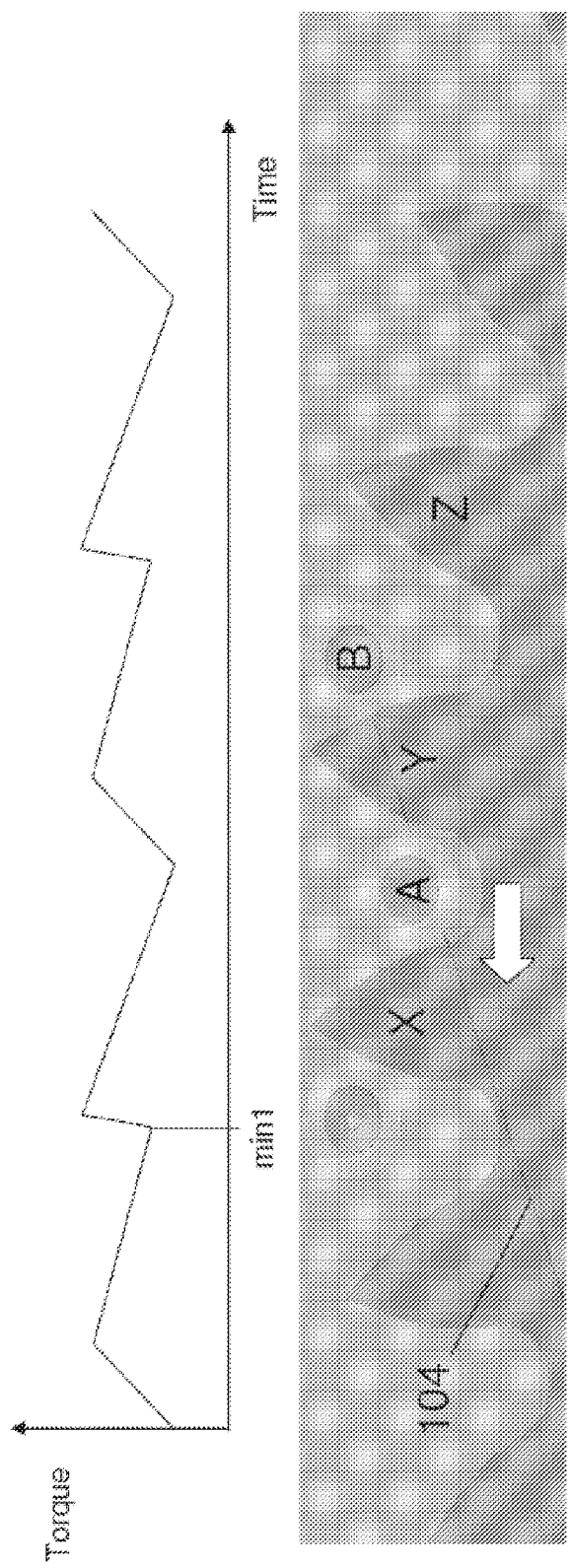

FIG. 5 shows the relative positions of the rollers and sprocket teeth at the torque minimum, min1. Between max1 and min1 roller A has disengaged from tooth X and roller B has maintained engagement with tooth Y but has moved along the tooth profile. Force vector 104 indicates that roller B has moved closer to the driven gear centre, with little change in its force vector angle. As a result of these changes, torque has decreased to a minimum.

Figure 6:
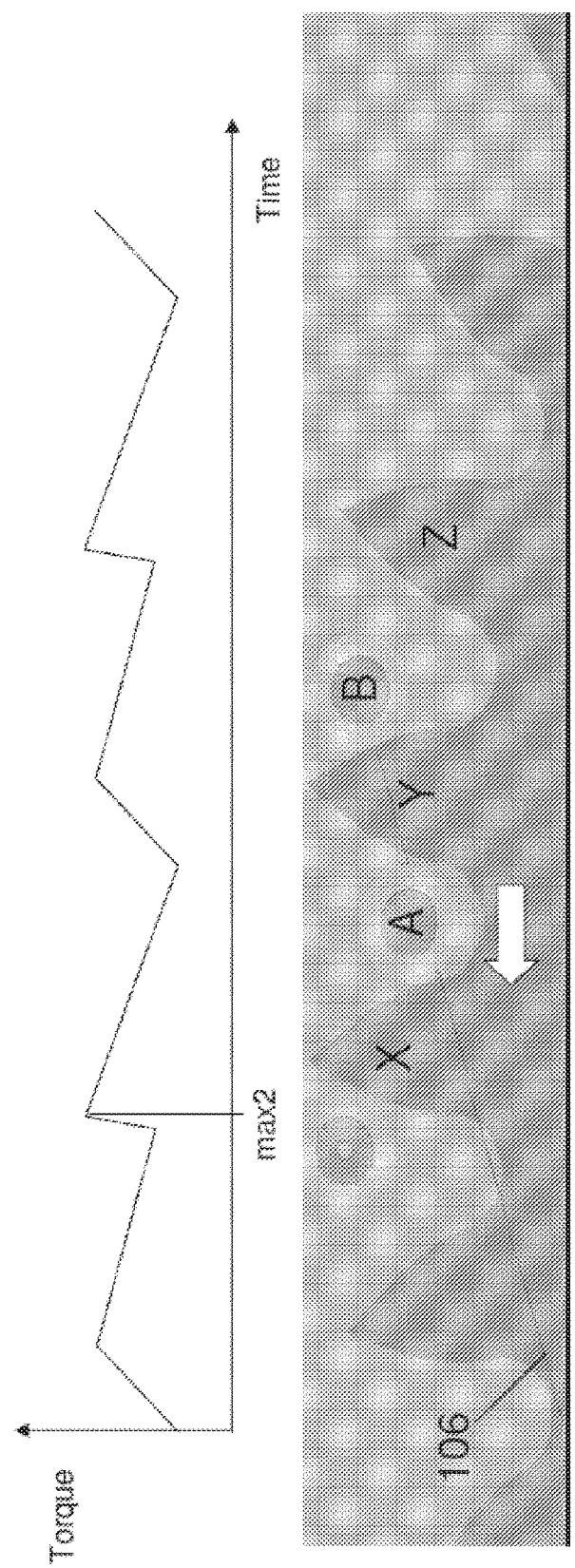

FIG. 6 shows the relative positions of the rollers and sprocket teeth at the second torque maximum, max2. Between min1 and max2 roller B has moved further along the tooth profile of tooth Y. Force vector 106 shows that, although roller B has moved closer to the driven gear centre, its force vector angle has increased to nearer 90 degrees because of a change in the tooth profile shape. These changes have resulted in a torque increase from min1 to max2.

Figure 7:
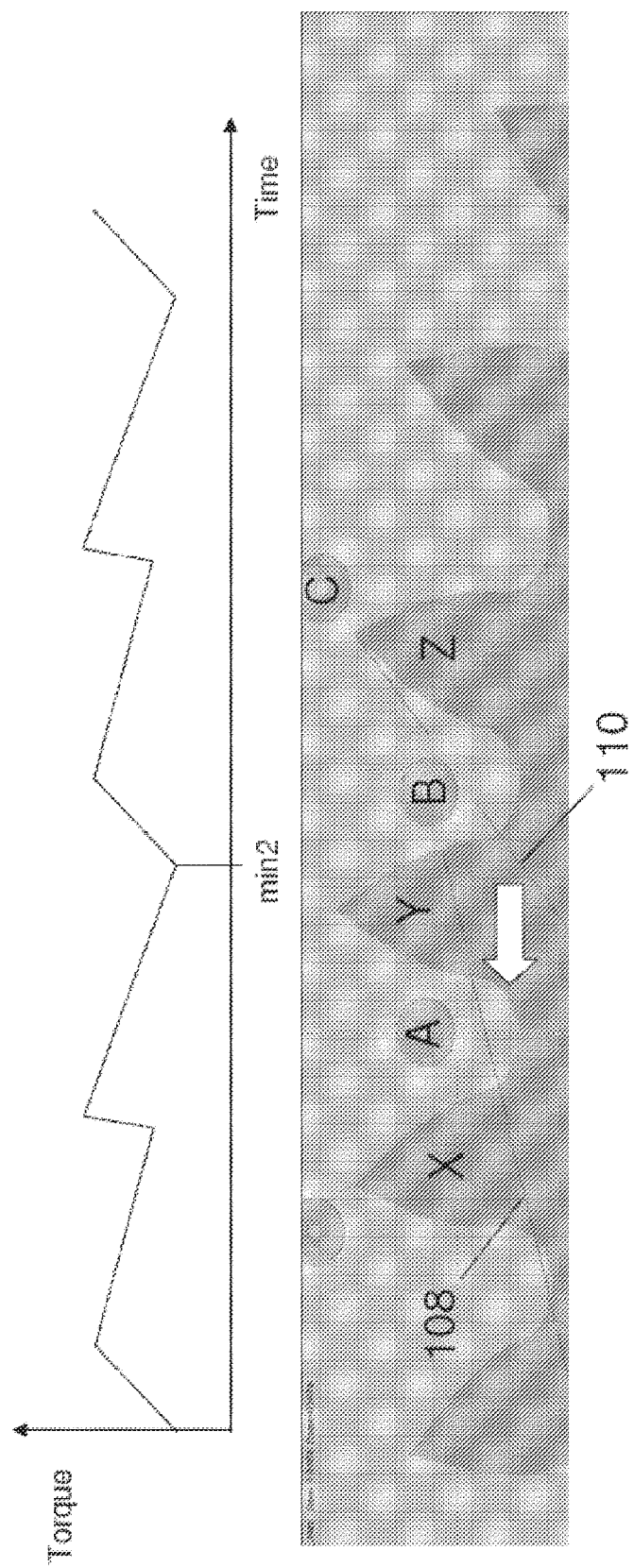

FIG. 7 shows the relative positions of the rollers and sprocket teeth at the second torque minimum, min2. Between max2 and min2 roller B has moved still further along the tooth profile of tooth Y, force vector 108 showing that roller B has moved closer to the driven gear centre but with little change to its force vector angle, resulting in a decrease in transferred torque. Roller C has moved into engagement with tooth Z, force vector 110 showing that its transferred torque is initially low despite its high distance from the driven gear centre, since its force vector angle is substantially lower than 90 degrees.

The fluctuations in torque transfer between the drive pinion and driven gear illustrated in FIGS. 4 to 7 are undesirable in a drive system according to embodiments of the invention because they result in undesirable vibration within the landing gear and drive system during operation of the drive system, as discussed above.

These variations will all be influenced by the degree of separation of the respective rotational axes of the drive pinion and the driven gear. Therefore, a variation in the separation of rotational axes of the respective gears can influence the amount of fluctuation in the torque indicated the graphs in FIGS. 4 to 7.

In addition to the torque fluctuation illustrated in the figures, a number of alternative parameters can also be indicative of the variations in transmission error. For example, an actual centre distance between the respective meshing gears may be directly measured and compared with an ideal centre distance. However, this will not necessarily take into account deformations in parts of the system, such as a wheel hub, to which the sprocket or roller gears are applied. In particular, when a gear is applied to the hub of an aircraft wheel, or a wheel of any heavy vehicle, then some "ovalisation" of the wheel can occur when heavy loads are applied to the wheel. This means that centre distance is not necessarily an accurate indicator of the relative positions of rollers and sprocket teeth when applied to a related drive system.

Therefore, it can be more beneficial to monitor other parameters which are more directly indicative of the conditions at the transmission interface between first and second gears and generally within the transmission itself. Further parameters which can be usefully measured are: a torque measured in the drive path from the motor to the wheel of the landing gear, or a torque measured in the drive path from the first gear to the second gear. A current draw of a motor providing drive input to the drive system can also be indicative of a torque in the drive system. Therefore, a variation in current draw of the motor can indicate a degree of transmission error. Measurement of a direct torque at the motor providing drive input to the system or at a gear driven directly by the motor to input drive to the drive system can also be beneficial. Measurement of a rotational velocity of one of the first and second gears can also he useful. For example, if one of the gears is rotating at a constant rotational speed, a measurement of variations in a rotational velocity of the other gear can indicate variations in transmission error, and so minimising such a signal can minimise transmission error through the drive system and the related vibrations generated by the transmission error. Further, a measurement of a difference in rotational velocity between the first and second gears can also indicate a transmission error through the drive system and so this variation can also be measured and minimised by actuation of the actuator 58, to help to minimise variations in transmission efficiency and related vibrations.

It will therefore be appreciated that a measurement of a magnitude of the fluctuations illustrated in the graphs of FIGS. 4 to 7 can be input to an algorithm and adjustments can be made to the actuator to adjust a separation of gears of the transmission in order to minimise the magnitude of the measured fluctuations. This can be done in a closed feedback loop and adjustments made until a minimal magnitude of the variations is found.

By actuation of the actuator, a minimised level variation can therefore generally be achieved. However, over time, as the components of the drive system, such as gears, sprocket teeth or rollers, wear, then the minimum fluctuation which can be achieved may begin to grow over time. Once it is no longer possible to reduce the variation in the measured parameter beyond a certain point, it may be concluded that the teeth of the sprocket, the rollers, mounting pins of the rollers, bearings, or any component of the drive system, may be excessively worn. In this case, a suitable output may be generated by a controller to give an indication to either maintenance personnel or to a user of the system that it is time to change components of the system. Therefore, measurement of the described signal can be used to identify a wear condition of the first and/or second gears, or other related components of the drive system.

Figure 8:
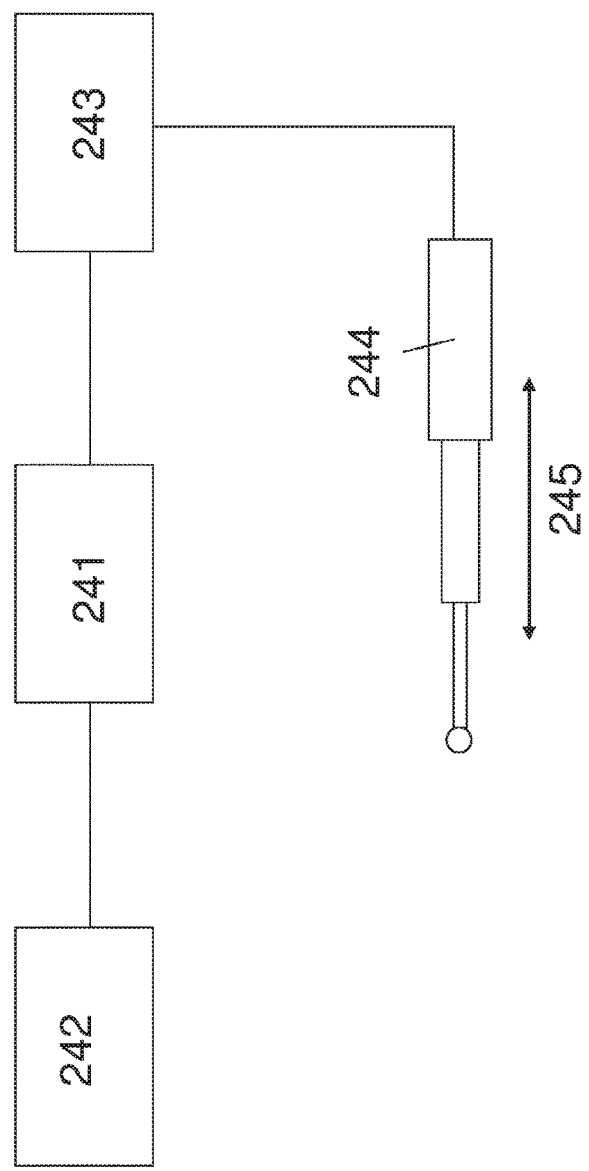
FIG. 8 shows a block diagram of a control system for the drive systems of preceding embodiments.

FIG. 8 indicates a schematic diagram of a control system which may be used to implement the control of the drive system of the present invention. The control system comprises a controller 241. A sensor 242 is arranged to detect at least one parameter indicative of a transmission error through the first and second gears and to generate an output indicative of the sensed parameter. The sensed parameter can be any of the measured parameters discussed in the above. The output of sensor 242 is input to a controller 241. The controller is arranged to process the input signal to arrive at a decision concerning a direction in which actuator 244 should be actuated, if at all. Between actuator 244 and controller 241, there may be a converter 243. This can convert a low power control signal from the controller 241 into a higher power actuation signal, in a different form if necessary.

The output of converter 243 may be a hydraulic, pneumatic, electrical or mechanical output and generally acts to cause actuator 244 to move in one direction or the other in the directions indicated by arrow 245. However, although a linear actuator 244 is shown in the schematic drawing of FIG. 8, it will be appreciated that a non-linear, or rotational, actuator can also be used to cause variations in the separation of the first and second gears of the drive system. The sensor 242 will give either a constant output, or a periodically sampled output, which is then processed by controller 241 at a certain frequency. Therefore, once adjustments are made to the actuator 244, then variations in the parameter sensed by sensor 242 will be again detected by a sensor and input to the controller.

If the controller senses an improvement in the minimisation of variations in the sensed signal, then it may actuate the actuator 244 further in the same direction. Alternatively, if it detects a worsening in the fluctuations in the signal detected by the sensor, then it may actuate the actuator in the opposite direction to try to reduce the signal variations. Further control regimes can be envisaged, which would process the output of the sensor 242 in the controller 241 to actuate the actuator 244 to minimise variations of the signal detected by the sensor 242.

In the drive system illustrated in FIGS. 1 to 3, the actuator 244 (shown in FIG. 8) which adjusts the distance between respective rotational axes of the gears is the same actuator as actuator 58 which moves the drive system between the neutral configuration in which the drive pinion 60 does not mesh with the driven gear 20, and the driven configuration in which the drive pinion 60 is in meshed engagement with the driven gear 20.

It will be understood that the invention extends to alternative embodiments of the drive system shown in FIGS. 1 to 3.

Figure 9:
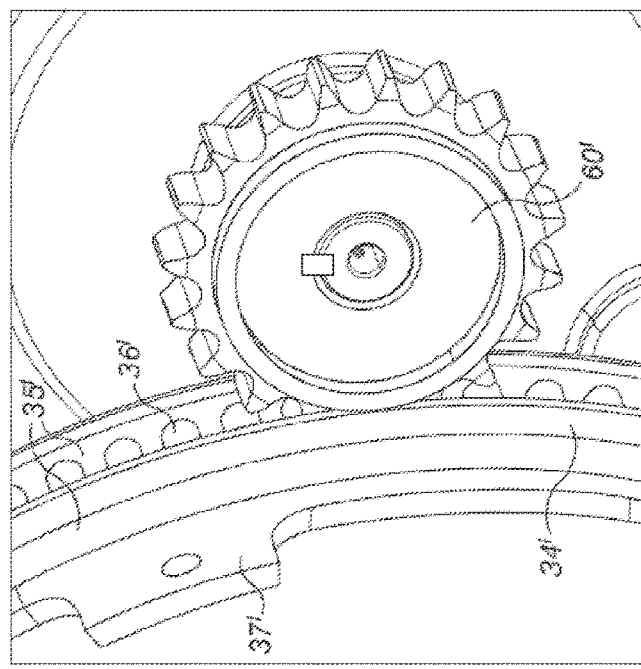
FIG. 9 shows an isometric detail view of selected components of the drive system of FIG. 1 with an alternative drive pinion and driven gear.
Figure 10:
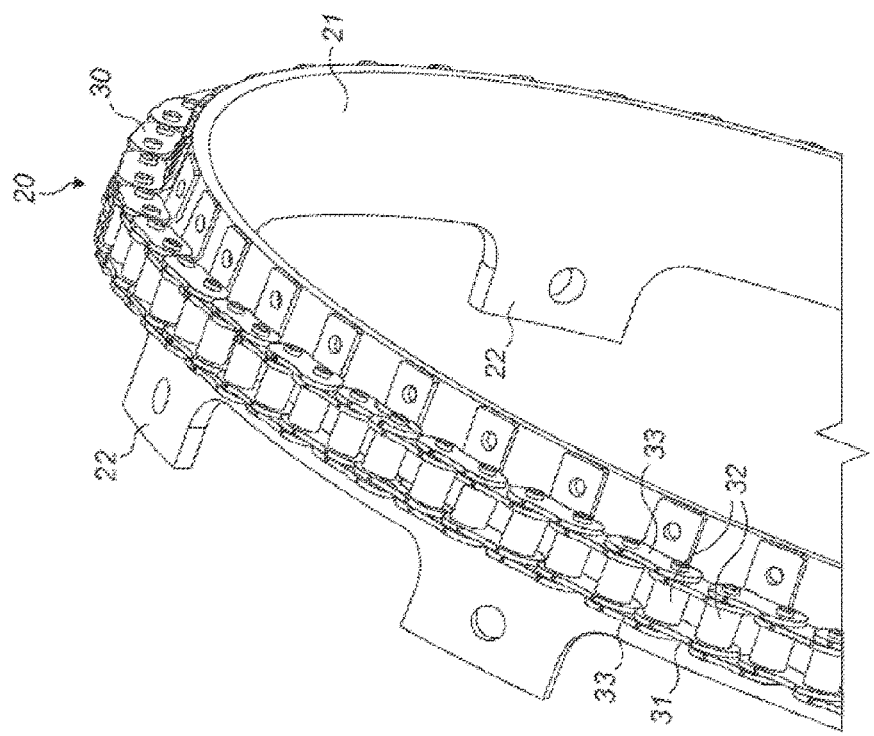
FIG. 10 shows an isometric view of an alternative driven gear of the drive system of FIG. 11.
Figure 12:
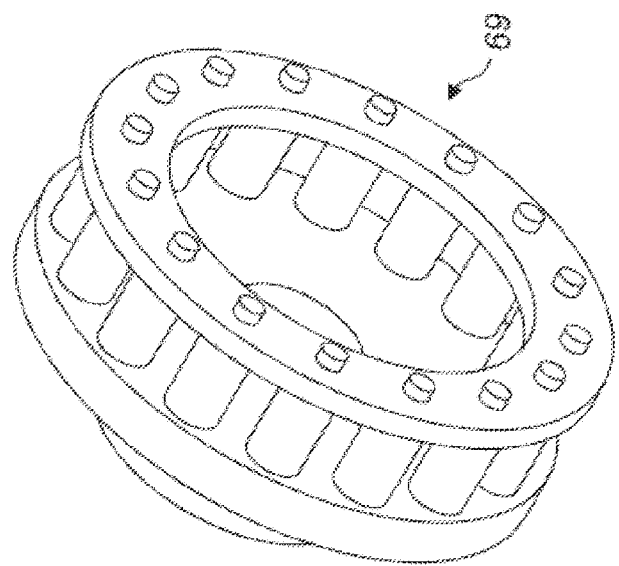
FIGS. 11 and 12 show isometric views of alternative drive pinions.
Figure 11:
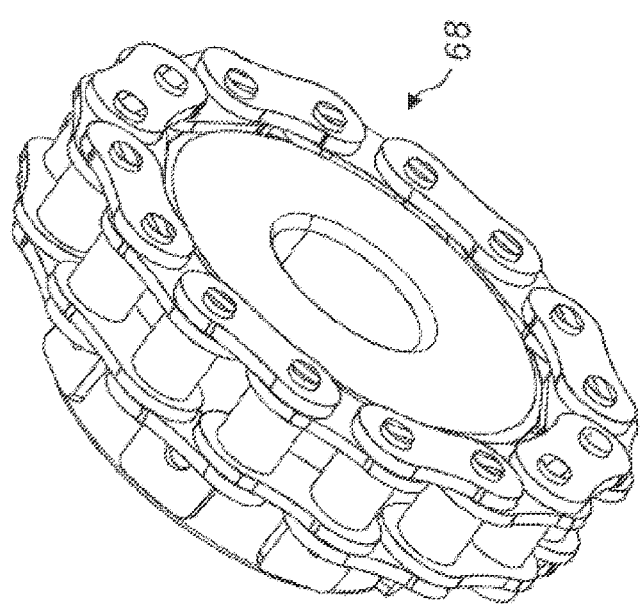

The actuator 244 may be arranged differently to that described above such that its output is not the same as that of actuator 58 under a common controller. For example, the actuator 244 may be used to control the position of a stop that limits the travel of the actuator 58 in the driven configuration of the drive system. By adjusting the stop position the distance between respective rotational axes of the gears is adjusted. The stop may he configured in a variety of ways. For example, the stop may be a block having a bearing surface which contacts the gearbox 70 to limit rotation of the gearbox 70 about its pivot axis. Alternatively, the stop may be a pin at the pivot axis that limits the rotation of the gearbox 70 about its pivot axis. Alternatively, the stop may be a blocking element in the actuator 58 that limits the extent of travel of the actuator piston. The stop may be configured in any number of similar ways to the same effect.

in variations to the embodiments described above, the drive pinion may be formed as a sprocket 60' (see FIG. 9) having a single row of teeth, and the driven gear may be formed as a roller gear having a single row of rollers. The roller gear may take many forms, including the roller gear 34' of FIG. 9 and the roller chain gear 20 variant of FIG. 10. In the roller chain gear 20 of FIG. 10 a roller chain 30 extends around a rigid annular extension ring 21. The roller chain 30 is driven by a single sprocket (not shown) similar to the sprocket 60'. The extension ring 21 (or drum) is rigidly attached to the hub 18 via a plurality of extension tabs 22 so that it extends from an outer circumference of the hub 18 towards the leg 12. A roller chain 30 is fixed around the outer circumference of the extension ring 21 so that it forms a continuous track around the ring 21. The roller chain 30 comprises multiple interlinked chain elements 31, each comprising a sub-assembly of two rollers 32 mounted on parallel axes. Each roller 32 is rotatable about a bush (not shown) which is itself mounted on a pin (not shown). Each chain element 31 is pivotally mounted to its neighbouring element by a pair of link elements 33 so that the rollers 32 are arranged to form a continuous track, or series, and each element 31 is thus designed to be able to rotate relative to its neighbour. Of course, since the roller chain 30 is fixed to the extension ring 21, the chain elements 31 are prevented from pivoting relative to one another. The driven gear may include a plurality of multiple coaxial chains engagable by a pinion formed by multiple coaxial sprockets.

in a further variation, illustrated in FIGS. 11 and 12, the drive pinion may alternatively comprise a single ring of rollers for engaging with a driven gear formed as a sprocket (not shown) having a single row of sprocket teeth. The roller gear may take many forms, including a typical roller gear such as roller gear 69 in FIG. 11, or a roller chain gear 68 such as that shown in FIG. 12.

The embodiments described above are suitable only for ground taxiing operations but could be modified (e.g. by adjustment of the gearbox ratio) to be suitable for only pre-landing spin-up operations. In the taxiing configuration the linear actuator 58 (which may be back drivable) may be torque controlled (or current controlled) to apply a substantially constant load between the sprockets 60 and the driven gear 20, thereby allowing for some deformation of the various component parts of the drive system 50 while at the same time preventing unwanted separation. An electro mechanical brake (not shown), or other similar blocking device, may be integrated within the actuator 58 to lock the actuator in the disengaged (second) configuration.

Figure 13A:
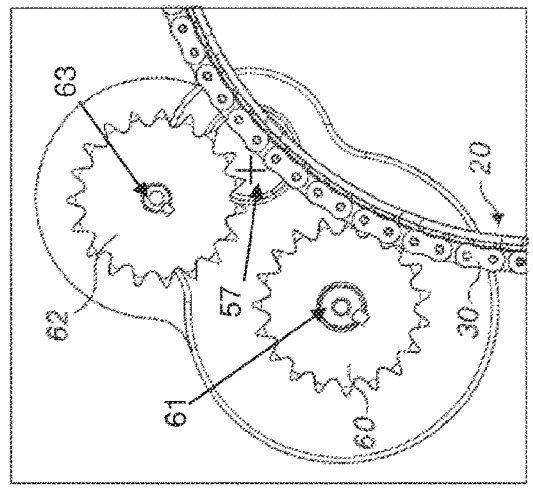
FIGS. 13(A)-(C) show side views of an alternate drive system with two drive pinions, the drive system being shown in a ground taxi configuration (A), neutral configuration (C) and spin-up configuration (B).
Figure 13B:
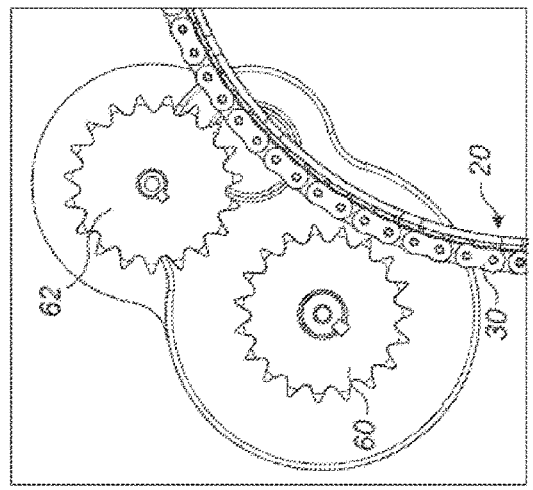
Figure 13C:
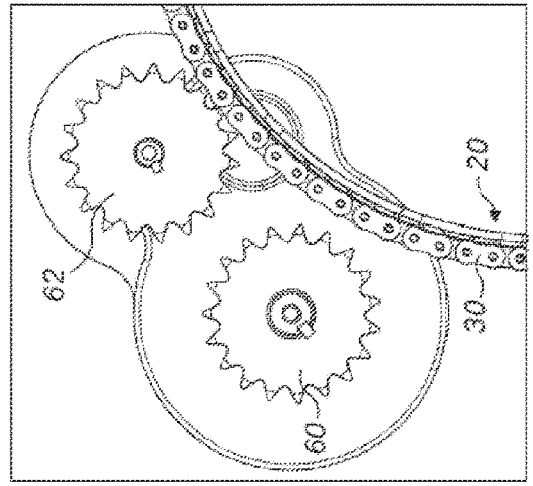

In a further alternative embodiment the drive system may include two drive pinions, as shown in FIGS. 13(A)-(C). The drive system comprises a motor (not shown) which rotates an input shaft which itself rotates first 60 and second 62 output sprockets via a gearbox having two separate drive paths—one for driving the first sprocket 60 and one for driving the second sprocket 62. The first 60 and second 62 sprockets are each wheel-type sprockets with radially-extending teeth which can interlock with the rollers 32 of the roller chain 30 (or rollers 36 of roller gear 34). Linear movement of the actuator (not shown) is translated to rotational movement of the drive system. Because of the location of the pivot axis 57 between the rotational axes 61, 63 of the sprockets 60, 62, the drive system 50 can be rotated between a position in which only the first sprocket 60 engages the roller chain 30 (FIG. 13A) and a position in which only the second sprocket 62 engages the roller chain 30 (FIG. 13C). In a position between these two extremes neither sprocket 60, 62 engages the roller chain 30 (FIG. 13B). This pivoting arrangement ensures that it is not possible for both the first sprocket 60 and second sprocket 62 to engage the roller chain 30 at the same time.

Thus, the drive system of FIGS. 13(A)-(C) can be arranged to have three configurations: a low speed, high torque taxiing configuration in which the motor drives the wheel via the first drive path and first sprocket 60 (FIG. 13A); a high speed, low torque spin-up configuration in which the motor drives the wheel via the second drive path and second sprocket 62. (FIG. 13C); and a neutral (disconnected) configuration in which neither the first sprocket 60 nor the second sprocket 62 engages the roller chain (FIG. 13B). The taxiing configuration is suitable for accelerating the wheel 16 to speeds of 175 rpm (equivalent to 20 knots) during ground taxing, while the spin-up configuration is suitable for accelerating the wheel 16 to rotational speeds of 1400 rpm (equivalent to 160 knots ground speed) prior to touch down on landing.

In each of the arrangements described above the principle of achieving drive via meshing between a sprocket and roller gear/roller chain can be applied when the driven gear comprises the sprocket and the drive pinion comprises the roller gear/roller chain, and vice versa.

Although the figures only show features of the drive system 50 for driving one of the wheels 16, it is envisaged that these features may be mirrored for the other wheel 16.

That is, it is envisaged that one drive system 50 may be provided for each wheel 16. For a landing gear 10 with four or more wheels 16, a drive system 50 may be provided for each of the wheels 16, or only two of them. In embodiments in which only two of the wheels 16 are provided with drive systems 50, it may be necessary to provide further motors (not shown) to achieve pre-landing spin-up of the un-driven wheels, with ground taxiing being accomplished by the two drive systems 50. In other embodiments it may be possible to have one motor 52 shared between two drive systems 50. That is, the motor 52 may be arranged to rotate the input shaft of the gearbox 70 of each drive system.

Although the figures only show the drive system 50 supported by a bracket 56 which is rigidly connected to the axle 14 of the landing gear, the drive system 50 may alternatively be mounted on the upper telescopic part 12*a* (main fitting) or lower telescopic part 12*b* (slider).

Although the invention has been described above with reference to one or more preferred embodiments, it will be appreciated that various changes or modifications may be made without departing from the scope of the invention as defined in the appended claims.

The invention claimed is:

1. A drive system for an aircraft landing gear comprising:
   first and second gears for engagement to transfer a drive input to the system between the first and second gears;
   an actuator for adjusting a distance between rotational axes of the first and second gears;
   a sensor configured to detect at least one parameter indicative of a transmission error through the first and second gears; and
   a controller configured to control the actuator to adjust a distance between respective rotational axes of the gears, in response to the detected parameter, when the first and second gears are engaged to minimise the transmission error.

2. A drive system according to claim 1, wherein the detected parameter comprises a distance measured between respective rotational axes of the first and second gears.

3. A drive system according to claim 1, wherein the detected parameter comprises a torque measured at one or more points in a drive path from a motor to a wheel of an aircraft landing gear where the drive path includes the first and second gears.

4. A drive system according to claim 3, wherein the detected parameter comprises a torque differential between two points in the drive path, the two points being one on either side of the engagement between the first and second gears.

5. A drive system according to claim 1, wherein the detected parameter comprises a current draw of a motor providing drive input to the drive system.

6. A drive system according to claim 1, wherein the detected parameter comprises a current demand at a motor controller for controlling a motor providing drive input to the drive system.

7. A drive system according to claim 1, wherein the detected parameter comprises a rotational velocity at one or more points in a drive path from a motor to a wheel of an aircraft landing gear where the drive path includes the first and second gears.

8. A drive system according to claim 7, wherein the detected parameter comprises a rotational velocity differential between two points in the drive path, the two points being one on either side of the engagement between the first and second gears.

9. A drive system according to claim 1, wherein the controller is arranged for controlling the actuator to adjust the distance between respective rotational axes of the gears in response to a measurement of an amplitude of an oscillation of the detected parameter, or a rate of change of amplitude of an oscillation of the detected parameter.

10. A drive system according to claim 1, wherein the controller is arranged for controlling the actuator to adjust the distance between respective rotational axes of the gears to minimise an amplitude of an oscillation of the detected parameter, and the controller is arranged for controlling the actuator based on an amplitude of oscillation of the detected parameter.

11. A drive system according to claim 1, wherein the controller is arranged for controlling the actuator to adjust the distance between respective rotational axes of the gears to minimise a vibration induced in the drive system.

12. A drive system according to claim 1, wherein the controller is arranged for monitoring the detected parameter to identify a wear condition of the first and/or second gears.

13. A drive system according to claim 1, wherein the first gear is a roller gear comprising a series of rollers arranged to form a ring, each roller being rotatable about a roller axis located at a fixed distance from the rotational axis of the first gear; and wherein the second gear is a sprocket comprising an array of sprocket teeth for engagement with the rollers of the first gear.

14. An aircraft landing gear drive system comprising a drive system according to claim 1, wherein the first and second gears are arranged for connecting a drive input from a motor to a wheel of the landing gear via the first and second gears.

15. An aircraft landing gear drive system according to claim 14, wherein the drive system has:
    a first configuration in which the first gear is capable of meshing with the second gear to connect a drive input from the motor to the wheel, and
    a second configuration in which the first gear is not capable of meshing with the second gear.

16. An aircraft landing gear drive system according to claim 15, wherein an actuator is arranged to move the landing gear drive system between the first and second configurations.

17. An aircraft landing gear drive system according to claim 16, wherein the same actuator is used to move the landing gear drive system between the first and second configurations and to adjust the distance between rotational axes of the first and second gears in the first configuration.

18. An aircraft landing gear drive system according to claim 14, wherein one of the first and second gears is attached to the wheel of the landing gear, preferably at an outer diameter of the wheel hub.

19. An aircraft landing gear drive system according to claim 15, wherein movement of the landing gear drive system in the first configuration is limited by a stop, and the actuator for adjusting the distance between rotational axes of the first and second gears is coupled to the stop for moving the stop.

20. A drive system or aircraft landing gear according to claim 1, wherein the drive system is supported by a bracket which is rigidly connected to the axle, main fitting or slider part of the landing gear.

21. A drive system or aircraft landing gear according to claim 20, wherein the bracket includes two lugs comprising half-moon clamps to permit ready attachment and detachment of the bracket.

22. A method of controlling engagement of first and second gears in a drive system, comprising the steps of:
  detecting at least one parameter indicative of a transmission error through first and second gears of the drive system; and
  automatically adjusting a distance between respective rotational axes of the gears using an actuator in response to the detected parameter to minimise the transmission error.

23. A method according to claim 20, wherein the drive system comprises first and second gears for engagement to transfer a drive input to the system between the first and second gears; an actuator for adjusting a distance between rotational axes of the first and second gears; a sensor for detecting at least one parameter indicative of a transmission error through the first and second gears; and a controller for controlling the actuator to adjust a distance between respective rotational axes of the gears, in response to the detected parameter, when the first and second gears are engaged to minimise the transmission error, and wherein the first and second gears are arranged for connecting a drive input from a motor to a wheel of the landing gear via the first and second gears.

* * * * *